United States Patent

[11] 3,586,946

| [72] | Inventors | Koichi Sadashige<br>Berlin, N.J.;<br>Masaru Horii, Ooyamazaki-Cho, Japan |
|---|---|---|
| [21] | Appl. No. | 887,617 |
| [22] | Filed | Dec. 23, 1969 |
| [45] | Patented | June 22, 1971 |
| [73] | Assignee | RCA Corporation |
| [32] | Priority | Mar. 21, 1969 |
| [33] | | Great Britain |
| [31] | | 14945/69 |

[54] SERVOSYSTEM
6 Claims, 3 Drawing Figs.

[52] U.S. Cl. .................................................. 318/326,
318/398, 318/407
[51] Int. Cl. .................................................. H02p 1/04
[50] Field of Search .......................................... 318/326,
396—398, 407, 415, 416

[56] References Cited
UNITED STATES PATENTS

| 3,309,597 | 3/1967 | Gabor et al. ................... | 318/396 |
| 3,408,547 | 10/1968 | Saeger .......................... | 318/171 |
| 3,452,853 | 7/1969 | Mabon .......................... | 318/398 |
| 3,500,163 | 4/1970 | Moritz .......................... | 318/397 |
| 3,518,516 | 6/1970 | Pawletko ....................... | 318/396 |

*Primary Examiner*—Benjamin Dobeck
*Assistant Examiner*—K. L. Crosson
*Attorney*—Edward J. Norton ABSTRACT: A servosystem is provided for achieving reference velocity of a drive means from a stall condition in a minimal time. Means responsive to velocity error detection cause rapid acceleration condition to be maintained to the drive means until the reference velocity is reached. At the moment of crossover of the reference velocity, a controlled variable auxiliary error signal is generated and applied to the drive means. This limits the amount and duration of velocity overshoot, to rapidly stabilize the drive means at the reference velocity.

INVENTORS
KOICHI SADASHIGE &
MASARU HORII
BY James B. Hayes
Attorney

SERVOSYSTEM

This invention relates to motor control systems and more particularly, to apparatus for providing controlled rapid acceleration of a motor from a stalled condition to a predetermined velocity, permitting, for example the motor phase at that velocity to be locked to a predetermined phase reference.

Such performance is important and even critical where, for example, such a system forms part of the headwheel or capstan servo in a tape recorder-reproducer system. Today such recorder-reproducer systems are used widely in television broadcasting.

Some broadcast applications require presentation of a rapid continuous sequence of different segments of information, that may be available only from separate taped sources. In order to produce usable information from such recorders, the servos controlling the tape drive and rotating transducer, must be energized and obtain a highly stable operating condition. Since information continuity must be maintained, this must be accomplished in minimal time.

Developments in the tape recorder art have made stabilizing or velocity and phase lock up times for such servos of even three to four seconds undesirable. Providing increased gain servos can reduce the lock up time, but may cause stability problems due to disturbances following the steady state condition. Other approaches, for example, utilizing increased acceleration rates from stall, tend to produce a response where the drive means overshoots the desired operating point, experiencing damped oscillations which eventually approach the desired operating point. This technique may actually increase the overall time to acquire stabilized operation.

It is therefore an object of the present invention to provide an improved servo wherein stable operation at a desired drive condition is established in a minimal time interval.

Briefly, the system includes means for sensing the instantaneous velocity of the motor, and means for comparing the sensed velocity with the predetermined velocity to derive an error signal. There is also provided means for applying the error signal to a control amplifier which accelerates the motor to a predetermined velocity. The error signal is made to have a first value which causes the motor to accelerate rapidly, and a second value at which the motor acceleration is relatively small. Means are provided which are operative at the moment when the velocities are equal, for providing a momentary auxiliary error signal and for combining the auxiliary error signal with the first mentioned error signal to provide a composite error signal which rapidly changes from the first value to the second value at the moment that the velocities are equal. The auxiliary error signal causes the composite error signal to change from the second value and to approach a steady state value which is intermediate the first and the second values at a predetermined rate. The auxiliary error signal serves to compensate for overshoot of the motor, to cause the motor to stabilize at the predetermined velocity, thus making it possible where such operation is desired to bring the state of the motor to a phase locked condition, in a shorter time than would be required for such stabilization in the absence of the auxiliary error signal.

FIG. 3 is a series of waveforms useful in understanding the operation of the invention of FIGS. 1 and 2.

Figure 1:
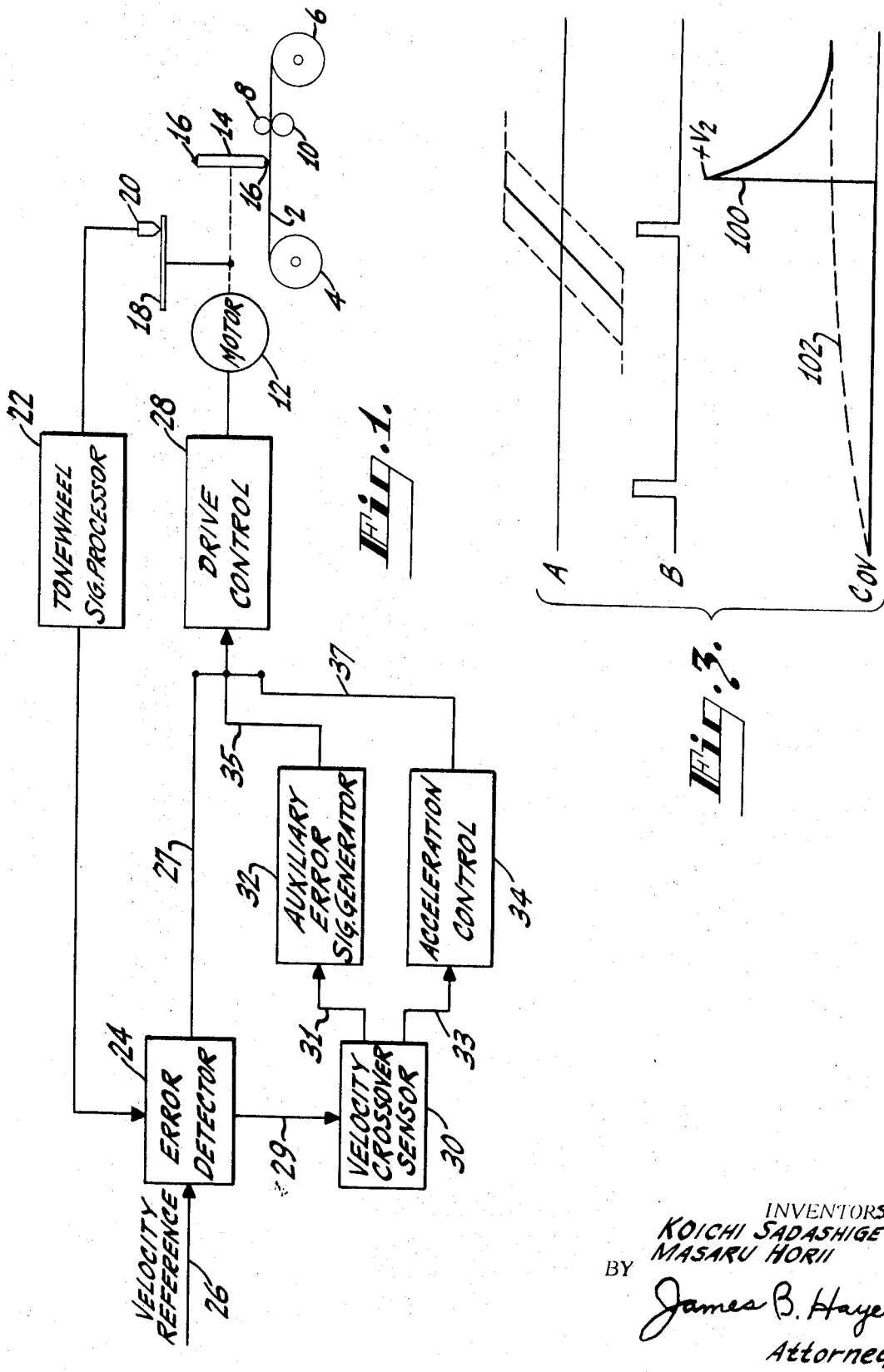
FIG. 1 is a diagram, in block form, of an embodiment of the invention.

FIG. 1 shows, in block form, a recorder-reproducer system having a headwheel servo and including the arrangement of the invention. In FIG. 1 there is a record medium 2, upon which a signal may be recorded. The record medium may be arranged in an endless loop (not shown) or arranged as shown extending between a supply reel 4 and a takeup reel 6. The record medium is driven between the reels by the combination of the capstan 8 and a pinch roller 10. A motor 12 is provided which drives the headwheel 14. The headwheel preferably has mounted thereon a series of transducing heads 16 for scanning the record medium 2. Also driven by the motor 12 is a tonewheel 18. The tonewheel 18 may be constructed of magnetic susceptible material with a notch or aperture therein. Each time the notch passes the pickup device 20, mounted adjacent thereto, a pulse is generated. In this or a similar manner a pulse is generated for each complete revolution of the headwheel 14. The output of the pickup 20 is coupled to the tonewheel signal processor 22, which provides a pulse train indicative of the velocity of the motor 12 and therefore the velocity of the headwheel 14. The train of pulses from the tonewheel signal processor 22 forms one input to an error detector 24. A second input to the error detector 24 is provided in the form of a second pulse train 26 representative of a fixed or reference velocity. A first output 27 of the error detector 24 is coupled to one input of a drive control means 28. The output of the drive control means 28 is provided to the motor 12. A second output 29 of the error detector 24 is fed to a velocity crossover sensor circuit 30. The crossover sensor circuit 30 provides a first output 31 at a first fixed level, when the velocity of the headwheel 14 is greater than the reference velocity. A second output 33 of the crossover sensor 30 is provided at a second fixed level, when the headwheel 14 velocity is less than the reference velocity. The first output 31 of the crossover sensor 30 is fed to an auxiliary error signal generator 32, which has an output 35 coupled to the input of the drive control means 28. The second output 33 of the crossover sensor 30 is coupled to an acceleration control means 34, the output 37 of which is also fed to the input of the drive control means 28.

In the operation of the system of FIG. 1, the motor 12 is initially in a stall or nonrotating condition. There is therefore no output from the tonewheel signal processor 22. The first output 27 of the error detector 24 for this condition therefore represents a maximum error condition. This maximum error condition causes the drive control means 28 to apply maximum drive to the motor 12. The motor 12 now begins to turn or rotate producing an output from the tonewheel signal processor 22. The error detector 24 in response thereto provides at its first output 27, a signal whose magnitude varies in accordance with the sensed velocity difference. During this initial acceleration period of the motor 12, in which its velocity is less than the reference velocity, the velocity crossover sensor 30 produces a signal at its second output 33 to the acceleration control means 34. In response to this condition, the acceleration control means 34 is operable in a manner to cause the effective signal input condition to the drive control means 28, to be maintained at a value which produces maximum drive and hence maximum acceleration of the motor 12.

When the velocity of the motor 12 crosses over or becomes equal to the velocity of the reference, the velocity crossover sensor 30 produces a second fixed signal level at its first output 31. The auxiliary error signal generator 32 in response to this output, provides an additional input signal 35 to the drive control means 28. The second signal provided to the drive control means 28 is such as to cause a variable drive control to the motor 12. This control in accordance with the second input, varies from a value representing minimum drive to the motor, to an intermediate value in a time period determined by the circuitry of the acceleration error signal generator 34.

Figure 2:
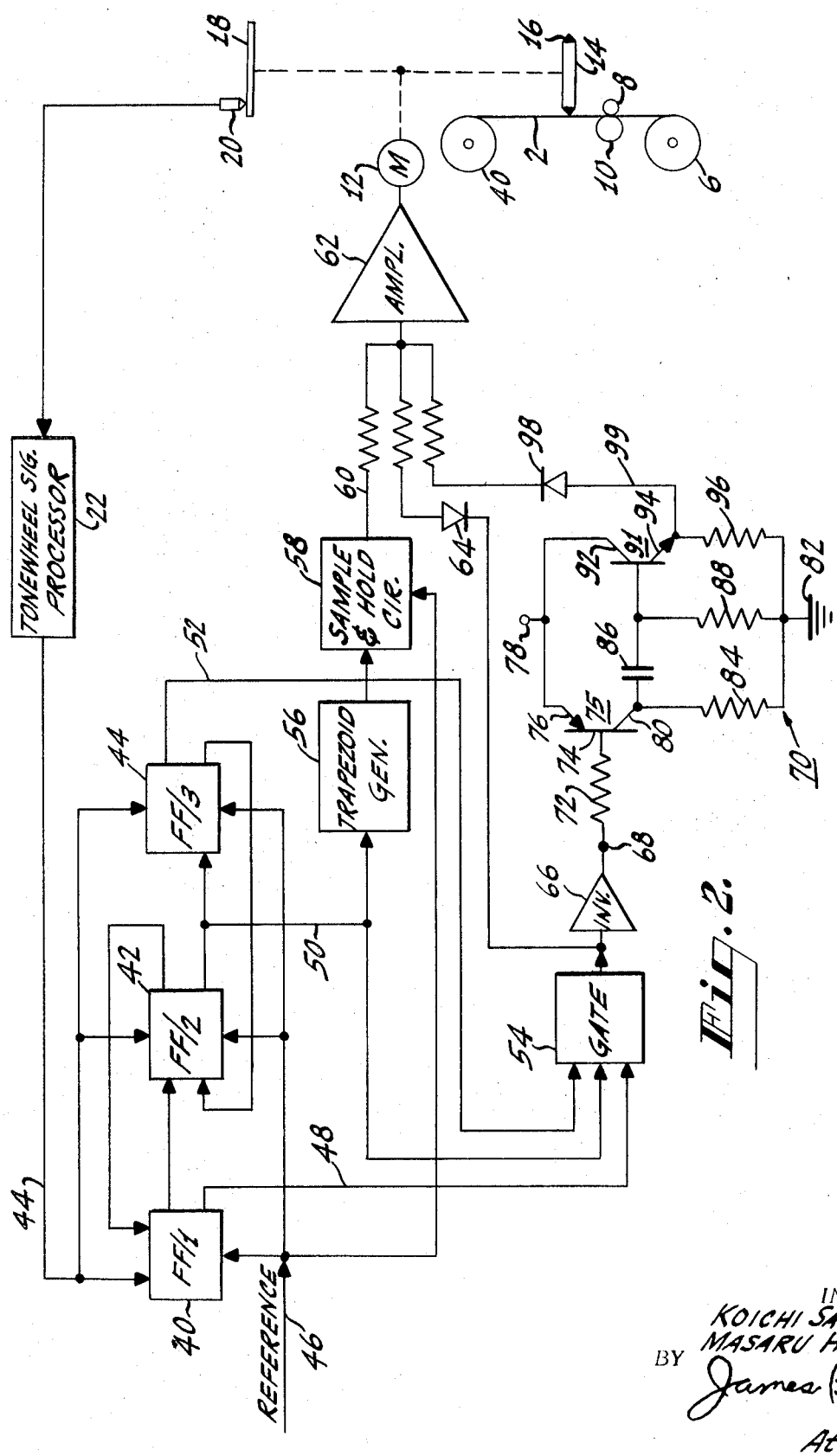
FIG. 2 is a partial diagrammatic and partial schematic diagram of an embodiment of the present invention.

If reference is made to FIG. 2 there is shown a recorder reproducer system including a particular embodiment of the invention. It will be understood in FIG. 2 that like numbered elements are as those shown and described in FIG. 1. In addition particular embodiments for the blocks of the system of FIG. 1 are shown. In FIG. 2 the error detector includes a group of interconnected flip-flop circuits 40, 42, 44. Such flip-flop circuits are well known in the art, and therefore for purposes of clarity, the details of their structure will not be discussed herein. A first input 44 to the flip-flops 40, 42 and 44 is in the form of a pulse train from the tonewheel signal processor 22. A second input 46 to the flip-flops 40—44 is in the form of a second pulse train whose repetition rate is indicative of a reference velocity. Respective outputs 48, 50, 52 of the flip-flops 40—44 are coupled to a gate means 54. The gate means 54 includes one or a series of interconnected logic gates such as NAND gates. Again the detailed structure of such gates and their mode of operation are well known in the art. The output 50 of flip-flop 42 is also provided as an input to a trapezoid generator 56.

The generator 56 provides a trapezoid or ramp waveform such as waveform A of FIG. 3, as a first input to sample and hold circuitry 58. The reference 46 is provided as a second input to sample and hold circuitry 58. Such circuits are known and therefore need not be discussed in detail. The generation of the trapezoid waveform A is controlled in accordance with the timing of output 50 of flip-flop 42. The dashed line waveforms of FIG. 3, indicate the variable timed nature of the generation of the output of generator 56. The second input to circuitry 58 (waveform B of FIG. 3) is operable to cause the value of the trapezoid waveform A at the occurrence of the reference signal 46 to be sampled. The sampled value is held, for example by capacitive means, and provided as an input on lead 60 to a control amplifier 62 for the motor 12.

The output of gate means 54 is coupled through a unidirectional conductive means, such as a diode 64, to the input of control amplifier 62. An output of gate means 54 is also fed through an inverting means 66 to the input 68 of differentiating circuitry 70. The differentiating circuitry 70, shown in FIG. 2, has a resistor 72 coupled between the input terminal 68 and the base 74 of a first PNP transistor 75. The emitter 76 of the transistor 75 is coupled to a suitable supply potential 78. The collector 80 of the transistor 75 is coupled to a point of ground potential 82 through the resistor 84. A capacitor 86 is coupled at one end to the junction of the collector 80 of the first transistor and the resistor 84. The other end of capacitor 86 is coupled through a resistor 88 to the point of ground potential 82. The junction of the capacitor 86 and resistor 88 is coupled to the base 90 of a second NPN transistor 91. The collector 92 of the transistor 91 is coupled to the source of bias potential 78. The emitter 94 of the transistor 91 is coupled to the point of ground potential 82 through the resistor 96. The junction of the emitter 94 of the transistor 91 and the resistor 96 is coupled through a controlled conduction means such as the diode 98 to the control amplifier 62 input.

In the operation of the arrangement of FIG. 2 initially the motor 12 is stalled i.e. not rotating, therefore the input to the error detector flip-flops 40—44 from the tonewheel signal processor 22 is absent. However, the reference velocity pulse train 46 is present at an input to the error detector flip-flop 40—44. The reference velocity input 46 causes the interconnected flip-flops circuits 40—44 to assume a first state. This first state is maintained until the motor 12 begins rotating and produces an output from the tonewheel signal processor 22. The output from the tonewheel signal processor 22 causes a change of state of the error detector flip-flops 40—44. The timing of the tonewheel signal processor 22 output, relative to the timing of the reference pulse train 46, thereafter determines the particular states of the flip-flops 40—44 and hence the signal levels provided to the gate means 54 and generator 56. The flip-flops 40—44 are interconnected such that as the motor 12 speed increases toward the reference velocity, the output of flip-flop 42 on lead 50 changes in accordance with the alternatingly arriving reference pulses 46 and tonewheel pulses of processor 22. When the motor 12 reaches and exceeds the reference velocity, two pulses from processor 22 will occur between successive reference pulses 46. This condition causes the flip-flop 44 output 52 to change, which is fed to gate means 54.

The alternating time varied output of flip-flop 42, during the under speed condition, causes successive trapezoid waveforms to be generated. These waveforms are sampled by successive reference pulses 46 in the circuitry 58, to produce a varied level to amplifier 62 on lead 60. The level on lead 60 varies from a first value at stall representing maximum drive to some intermediate steady state value at reference velocity. For purposes of explaining the operation presently, the value of the output of circuitry 58 is made to vary from zero toward a positive voltage value.

The gate means 54 in response to the inputs 48, 50 and 52 during the underspeed condition, is operable to provide at its output a signal at zero or ground potential. The positive value signal at the input to amplifier 62 causes diode 64 to be conductive, clamping or rendering the input to the amplifier at zero or ground potential. Since this value corresponds to the maximum error at stall, full drive is maintained on the motor 12. It will be understood that proper input and output impedances of the various circuitry, is provided to assure this operation. Thus the output of the sample and hold circuitry 58 which follows the detected velocity error is overridden.

At the moment of velocity crossover, i.e. the motor velocity equals the reference velocity, the output of flip-flop 44 is changed, causing the gate means 54 to suddenly shift its output level. Again for present purposes, the output level of gate 54 is made to shift to a positive level, which is greater than positive input level provided to amplifier 62 by the sample and hold circuitry 58. This voltage condition causes diode 64 to become nonconductive, releasing the input of the amplifier 62.

At the same time, an inverted form of the positive transition output of gate 54 turns on transistor 75. The output of transistor 75 causes transistor 91 to conduct, providing a sharp positive output level on lead 99. Due to the action of the RC network 86, 88, the output from transistor 91 on lead 99 then decreases or becomes less positive in a nonlinear manner determined by the circuit parameters of the differentiator 70. The signal provided from transistor 91 of the differentiator 70 is approximately as shown by the portion 100 of waveform C of FIG. 3. In the waveform C of FIG. 3, it is noted that initially the output of the differentiating circuitry 70 is substantially more positive than the output of the sample and hold circuitry 58, denoted by dashed curve 102. This provides desired minimum drive condition or the maximum instantaneous deceleration for the motor 12, to offset the situation that the motor 12 has been accelerated past the desired reference velocity. The signal condition thus produced across diode 98, causes diode 98 to conduct and apply the output of transistor 91 to the input of amplifier 62. The output of transistor 91 then decreases in a controlled manner, until diode 98 is back biased by the input of amplifier 62 from the sample and hold circuitry 58. Since now both diodes 64 and 98 are rendered nonconductive, error control of the motor through amplifier 62, is returned to the output of the sample and hold circuit 58.

It will be understood that the exact level and shape of the output of the differentiator 70, may be choses to just offset the tendency of the system to overshoot. Thus an efficient arrangement is provided to accelerate the motor in a minimum time interval, and compensate for the resultant undesired overshoot, to reach a stable desired reference velocity condition for the headwheel motor.

What we claim is:

1. In a motor control system for accelerating the motor to a predetermined velocity and phase condition, said system including means for sensing the instantaneous velocity of the motor, means for comparing the sensed velocity with said predetermined velocity to derive an error signal, and means for applying said error signal to a control amplifier which accelerates the motor to said predetermined velocity, said error signal having a first value which causes the motor to accelerate rapidly and a second value at which the motor acceleration is relatively small, the improvement comprising means operative at the moment when said velocities are equal for providing a momentary auxiliary error signal and for combining said auxiliary error signal with said first mentioned error signal to provide a composite error signal which rapidly changes from said first value to said second value at the moment that said velocities are equal, said auxiliary error signal causing said composite error signal to change from said second value to approach a steady state value intermediate said first and second values at a predetermined rate, said auxiliary error signal serving to compensate for overshoot of said motor so as to cause said motor to stabilize at said predetermined velocity in a shorter time than would be required for such stabilization in the absence of said auxiliary error signal.

2. The combination with a servosystem having means for driving a load, means providing a first signal indicative of the velocity of said load, and means responsive to said first signal and a second signal representative of a reference velocity for providing to said driving means a velocity error signal;

of fourth means coupled to said third means for providing an output indicative of a first condition wherein said load velocity is less than said reference velocity and of a second condition wherein said load velocity is greater than said reference velocity, fifth means coupled between said fourth means and said drive means and responsive to the output of said fourth means for causing maximum drive to be provided to said load during said first condition; and sixth means including signal shaping means coupled between said fourth means and said drive means and responsive to the output of said fourth means causing the drive to said load upon the occurrence of said second condition to be varied from a minimum value to a given intermediate value in accordance with the output of said signal shaping means.

3. A servosystem for accelerating a load from a static condition to substantially constant reference velocity in minimum time, comprising:

drive means coupled to said load;

control means for providing to said drive means a controlled energizing signal in accordance with inputs to said control means;

means for providing a first signal indicative of the velocity of said load;

error detecting means responsive to said first signal and a second signal indicative of said constant reference velocity for providing a first input to said control means with a value in accordance with said velocity error, said detecting means including further means for providing an output signal having first and second conditions indicative of said load velocity being respectively less than and greater than said reference velocity;

means coupled to said detecting means and responsive to the first condition of said output signal for clamping the amplitude of said first input to said control means to a value to cause sustained maximum energization of said drive means during said first condition of said output signal; and means coupled to said detector means output an operable in response to said second condition of said output for applying to said control means, a second input signal having a controlled amplitude variation from a value providing minimum drive of said load to said value of said first input, in a period sufficient to substantially reduce velocity overshoot of said load.

4. The invention according to claim 3, wherein said clamping means includes controlled signal conducting means and further said error detecting means includes means for providing respective levels to control said signal conducting means in response to said first and second velocity conditions.

5. The invention according to claim 3, wherein said detector means output provided rapid level transition between said first and second conditions, and said last mentioned means includes signal differentiating means including a timing network responsive to said detector output to provide controlled duration nonlinear amplitude variation of said second input signal.

6. The combination with a headwheel servo for providing from a stalled condition synchronized rotation of a transducer drive means with a first pulse train indicative of a reference velocity, wherein said servo includes means for providing a second pulse train indicative of the velocity of said drive means and a control amplifier for energizing said drive means, comprising: velocity error detecting means responsive to said first and second pulse trains for providing to the input of said control amplifier a third signal whose amplitude varies from a first value at said reference velocity in accordance with said error, fourth means coupled to said detecting means for providing an output signal level at the first value of said third signal when said drive means velocity is less than said reference velocity and a second level substantially greater than the second value of said third signal when said drive means velocity exceeds said reference velocity, unidirectional conducting means coupled between the output of said fourth means and said control amplifier input, second unidirectional conducting means coupled to said control amplifier input, and differentiating circuit means operable in response to a transition of said fourth means to said second level for providing through said second unidirectional conducting means a fourth signal to said control amplifier.

UNITED STATES PATENT OFFICE
CERTIFICATE OF CORRECTION

Patent No. 3,586,946          Dated June 22, 1971

Inventor(s) Koichi Sadashige et al.

It is certified that error appears in the above-identified patent and that said Letters Patent are hereby corrected as shown below:

Column 6, line 32 after the word "at" insert --said stall condition to a second value at--.

Signed and sealed this 14th day of December 1971.

(SEAL)
Attest:

EDWARD M. FLETCHER, JR.
Attesting Officer

ROBERT GOTTSCHALK
Acting Commissioner of Patents